(12) United States Patent
Bolling

(10) Patent No.: US 10,264,924 B2
(45) Date of Patent: Apr. 23, 2019

(54) FLUID MIXING VESSEL

(71) Applicant: Todd Anthony Bolling, Laurel, MD (US)

(72) Inventor: Todd Anthony Bolling, Laurel, MD (US)

(*) Notice: Subject to any disclaimer, the term of this patent is extended or adjusted under 35 U.S.C. 154(b) by 0 days.

(21) Appl. No.: 15/669,582

(22) Filed: Aug. 4, 2017

(65) Prior Publication Data

US 2018/0064289 A1 Mar. 8, 2018

Related U.S. Application Data

(60) Provisional application No. 62/371,186, filed on Aug. 4, 2016.

(51) Int. Cl.
| | | |
|---|---|---|
| *A47J 43/00* | (2006.01) | |
| *A47J 43/27* | (2006.01) | |
| *B65D 43/02* | (2006.01) | |
| *B65D 51/24* | (2006.01) | |
| *B65D 25/20* | (2006.01) | |
| *B01F 13/00* | (2006.01) | |
| *B01F 3/12* | (2006.01) | |
| *B01F 15/00* | (2006.01) | |
| *B01F 11/00* | (2006.01) | |

(52) U.S. Cl.
CPC ............... *A47J 43/27* (2013.01); *B01F 3/12* (2013.01); *B01F 11/0054* (2013.01); *B01F 13/0022* (2013.01); *B01F 15/00512* (2013.01); *B01F 15/00883* (2013.01); *B65D 25/20* (2013.01); *B65D 43/0225* (2013.01); *B65D 51/242* (2013.01); *B01F 13/005* (2013.01); *B01F 2215/0022* (2013.01)

(58) Field of Classification Search
CPC .... B01F 11/0054; B01F 3/12; B01F 13/0022; B01F 15/00512; B01F 15/00883; B01F 13/005; B01F 2215/0022; A47J 43/27; B65D 25/20; B65D 43/0225; B65D 51/242
See application file for complete search history.

(56) References Cited

U.S. PATENT DOCUMENTS 3,136,532 A * 6/1964 Rudnick ............... A47J 43/27
366/130
2017/0065943 A1* 3/2017 Dayton ............... B01F 13/0022

* cited by examiner

*Primary Examiner* — Anshu Bhatia
(74) *Attorney, Agent, or Firm* — Alfred F. Hoyte, Jr.

(57) ABSTRACT

A portable fluid mixing vessel for containing fluid. The vessel interior includes a mixing component designed for effecting mixing of a fluid with a powdered substance. The spring loaded component is releaseably attached to the bottom of the vessel interior, and is configured to gently break apart clumps of the powder allowing the powder to go into solution without over-mixing. A turbine is attached to the spring portion, the turbine having angled blades to induce a gentle stirring motion in response to vertical reciprocation of the turbine. The gentle breakdown of the powder creates a mixture which has a texture like that of a stirred mixture, as opposed to a pureed or blended mixture.

10 Claims, 6 Drawing Sheets

FLUID MIXING VESSEL

CROSS REFERENCE TO RELATED APPLICATION

This application claims the priority date of provisional application Ser. No. 62/371,186, filed Aug. 4, 2016.

BACKGROUND OF THE INVENTION

1. Field of the Invention

The present invention concerns a drink shaker. More particularly, the invention is directed to a fluid mixing vessel having internal features which facilitate more effective mixing of powdered additives.

2. Description of the Prior Art

Drink shaking vessels, particularly of the portable type used by athletes when training, have become increasingly popular in recent years. The vessels are typically made of lightweight materials so as to reduce the burden upon the athlete. The vessels are also characterized by having a watertight closure which can be quickly opened and closed to allow the athlete to periodically sip while in training.

U.S. Pat. No. 7,959,346 issued to Loden discloses a tumbler for mixing primarily alcoholic beverages. The vessel has a series of spikes or protrusions extending from the bottom interior surface. The spikes are designed to break ice so as to increase the water content of the beverage to be mixed.

U.S. Pat. No. 2,352,205 issued to Karlson discloses a drink mixing tumbler having internal ridges to increase fluid turbulence while shaking.

The present invention is directed to a portable fluid mixing vessel for containing fluid. The vessel interior includes a mixing component designed for effecting mixing of a fluid with a powdered substance. The spring loaded component is attached to the bottom of the vessel interior, and is configured to gently break apart clumps of the powder allowing the powder to go into solution without overmixing. A turbine is attached to the spring component, the turbine having angled blades to induce a gentle stirring motion in response to vertical reciprocation of the turbine. The gentle breakdown of the powder creates a mixture which has a texture like that of a stirred mixture, as opposed to a pureed or blended mixture.

SUMMARY OF THE INVENTION

It is an object of the invention to provide a fluid mixing vessel for mixing a powdered substance with a liquid.

It is another object of the invention to provide a fluid mixing vessel having interior features for increasing turbulence within the vessel.

It is another object of the invention to provide a fluid mixing vessel with coacting interior features.

Finally, it is a general goal of the invention to provide improved elements and arrangements thereof in an apparatus for the purposes described which is dependable and fully effective in accomplishing its intended purposes.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered with the accompanying drawings, in which like reference characters designate the same or similar parts throughout the several views, and wherein.

DETAILED DESCRIPTION OF THE PREFERRED EMBODIMENTS

Figure 1:
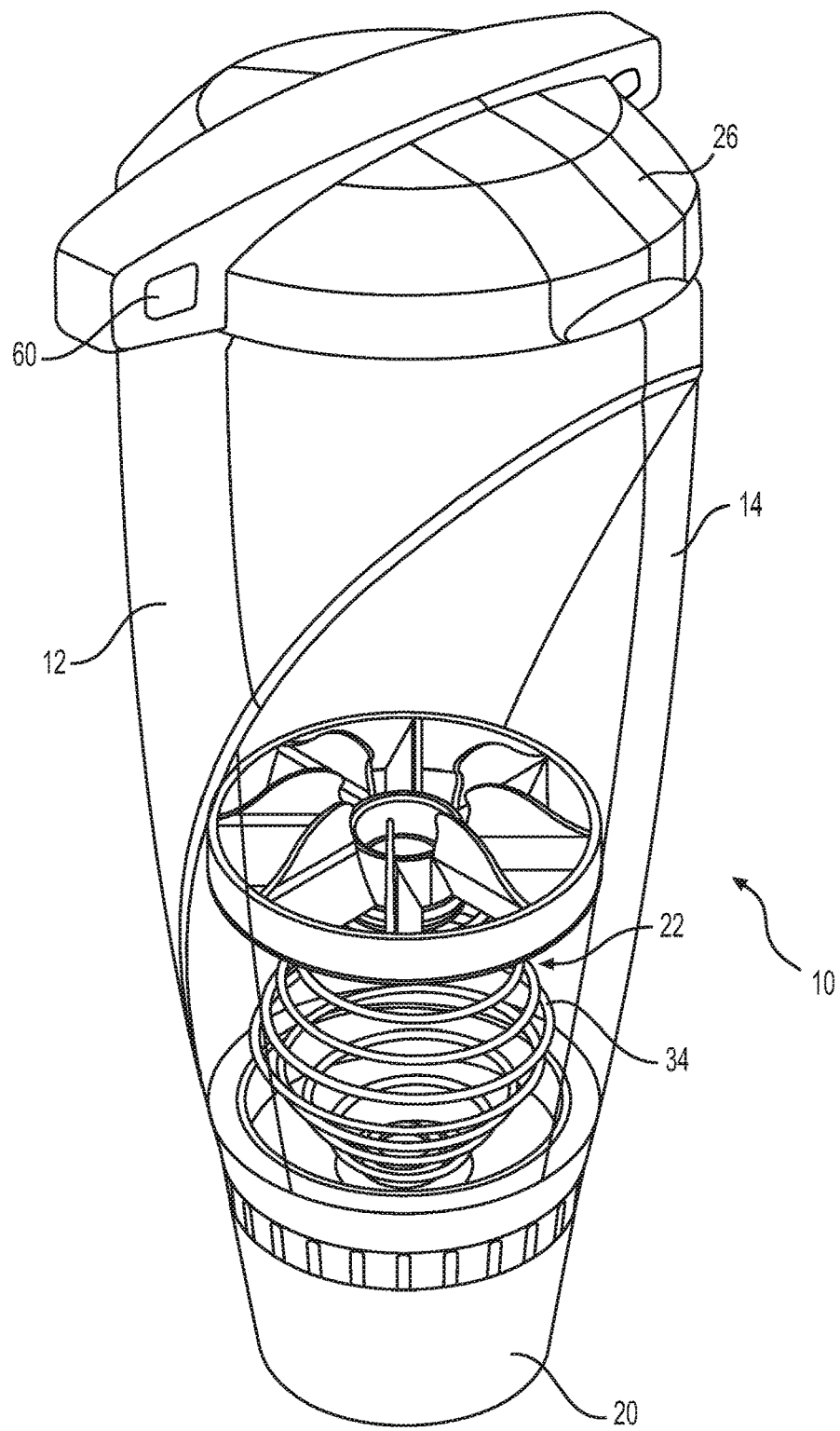
FIG. 1 shows a perspective view of the fluid mixing vessel of the invention.
Figure 2:
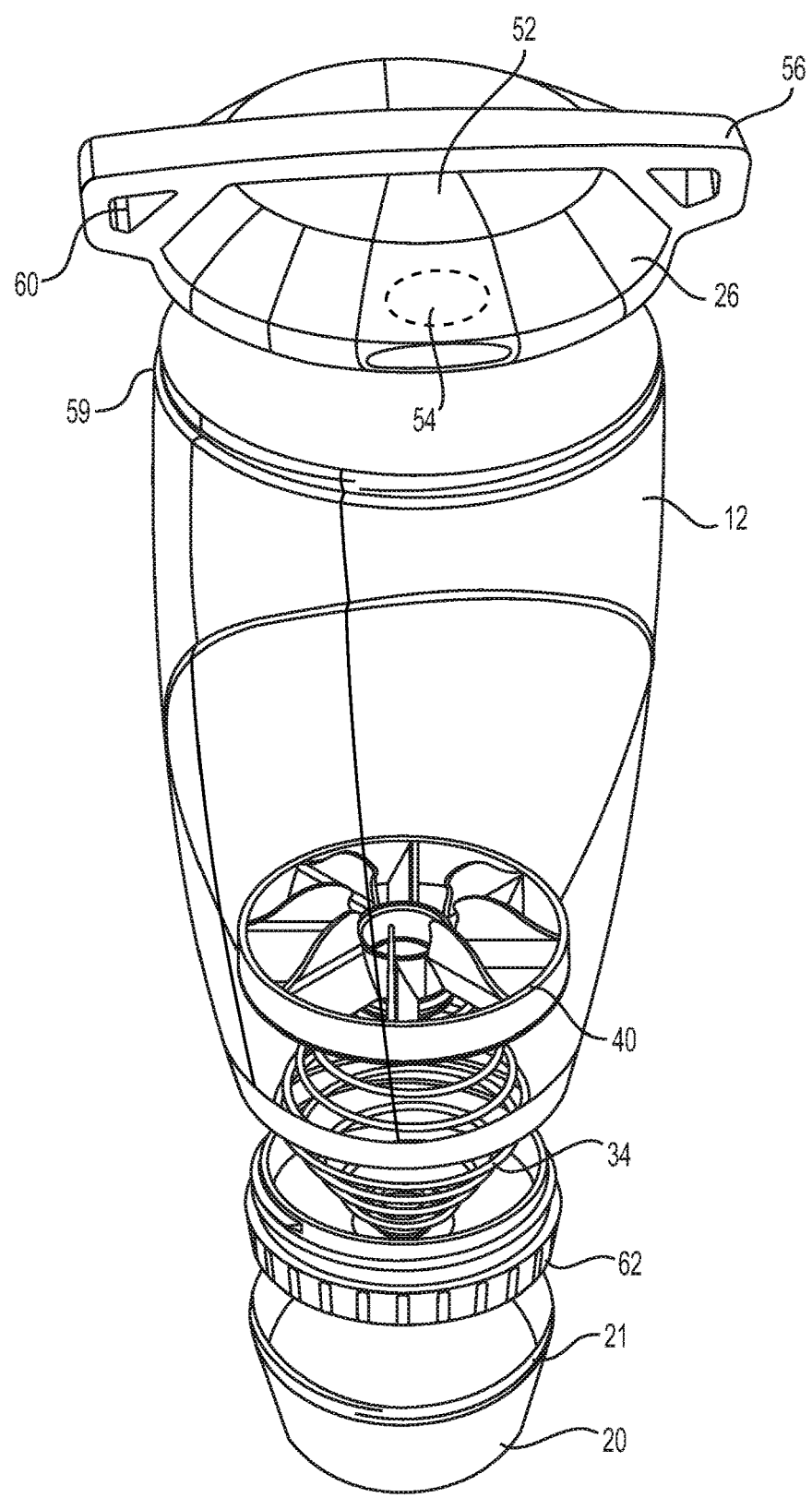
FIG. 2 shows an exploded perspective view of the fluid mixing vessel of the invention.
Figure 3:
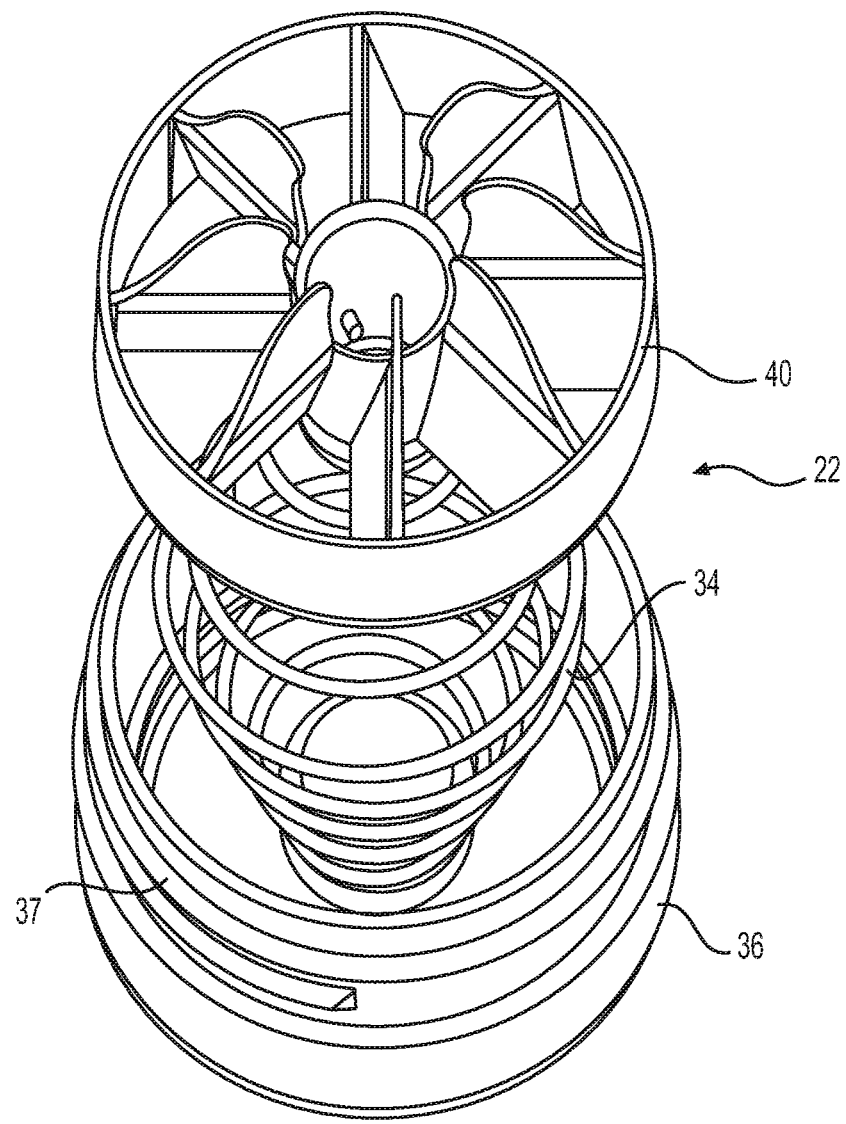
FIG. 3 shows a perspective view of a mixing element contained within the fluid mixing vessel of the invention.
Figure 4:
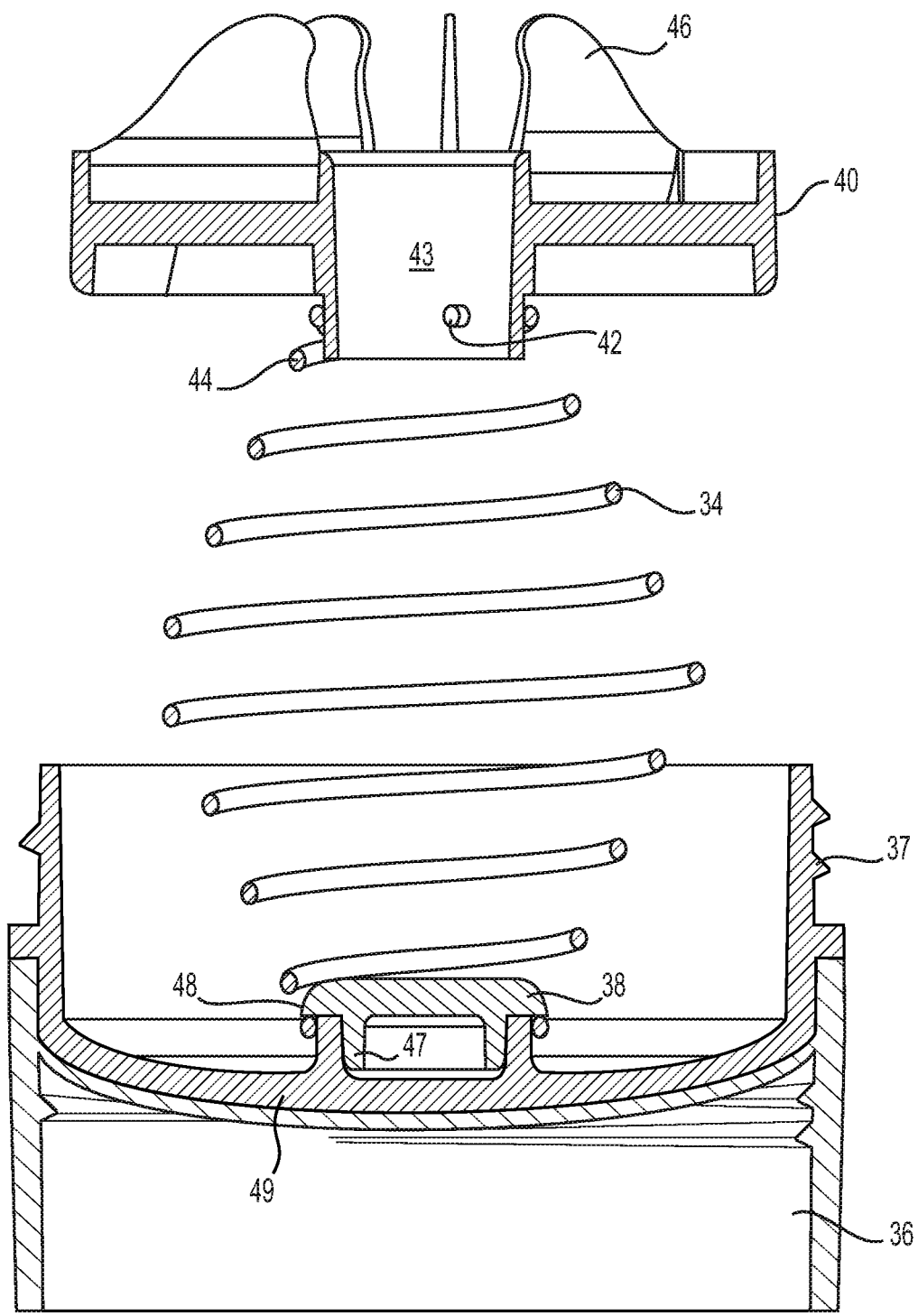
FIG. 4 shows a side view, partly in section, of the mixing element contained within the fluid mixing vessel of the invention.
Figure 5:
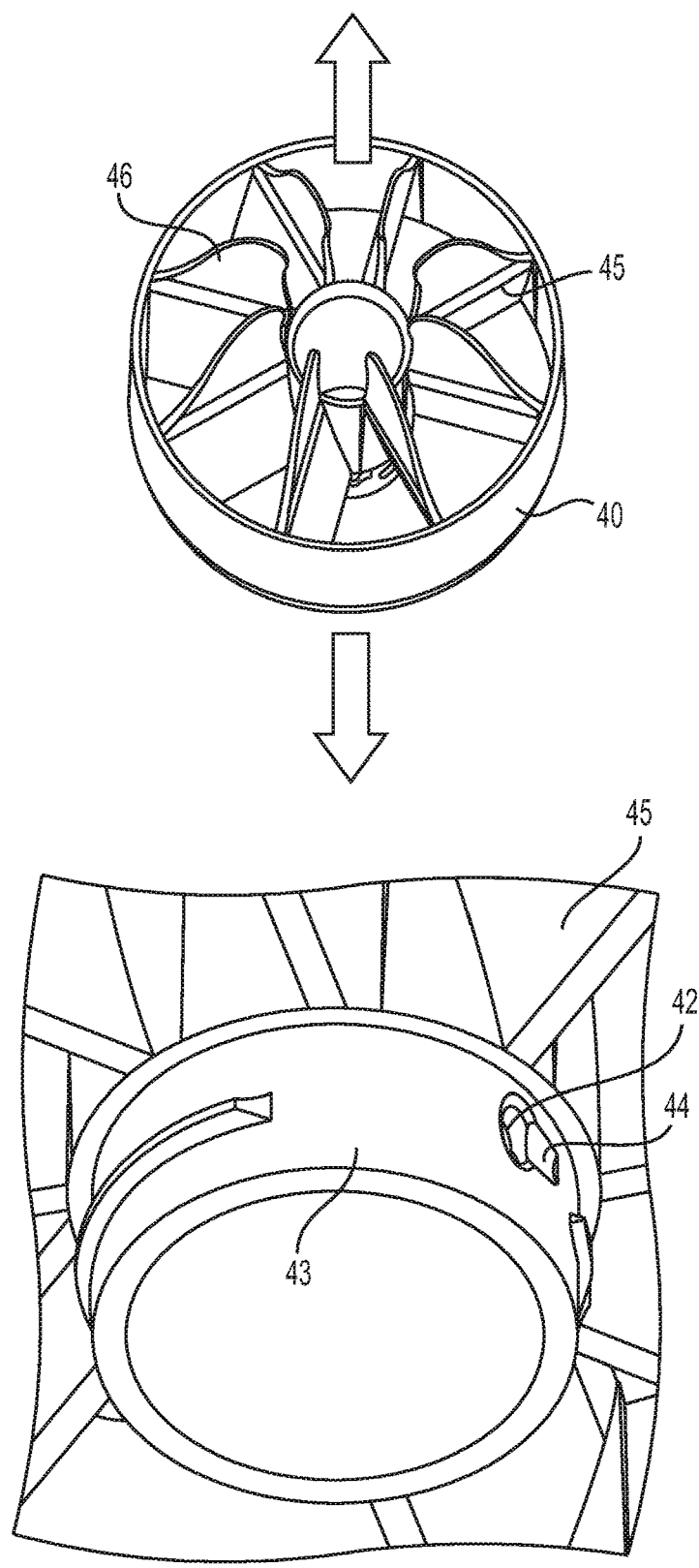
FIG. 5 shows a perspective view of a turbine of the mixing element, with a detail of the connecting hub of the turbine.
Figure 6:
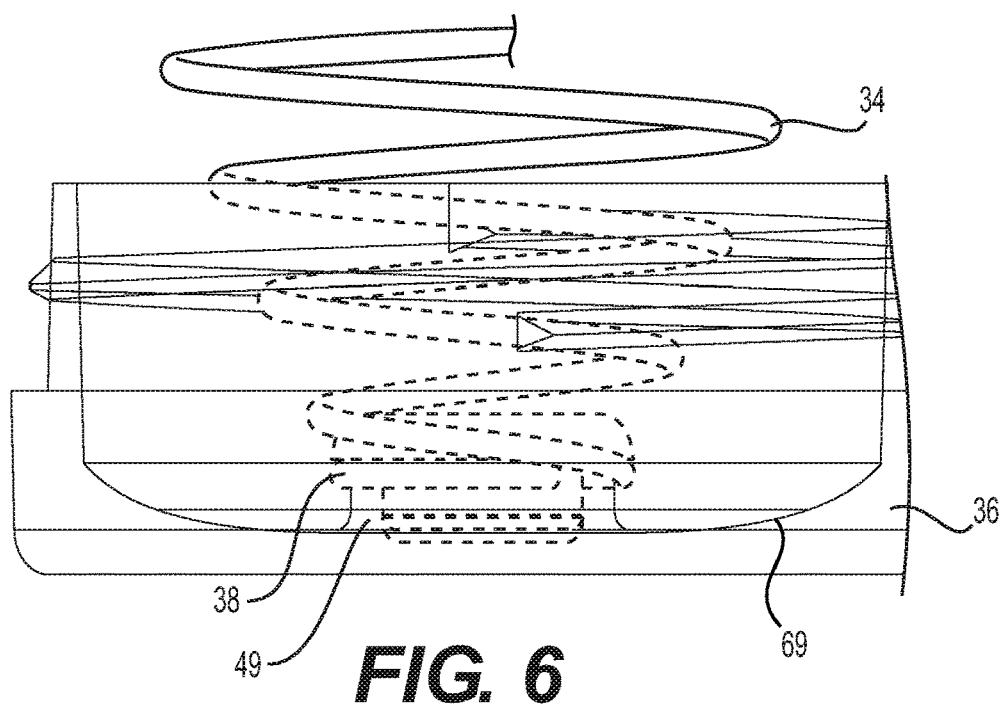
FIG. 6 shows a plan view, partly in section, of the bottom of the mixing element.
Figure 7:
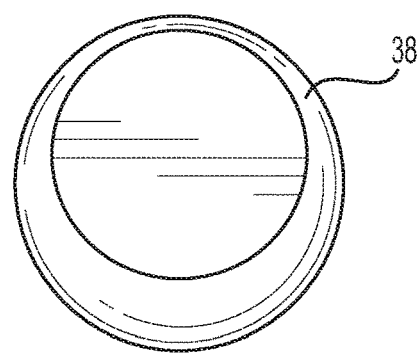
FIG. 7 is a top perspective view of a spring retainer used to retain the spring of the mixing element.
Figure 8:
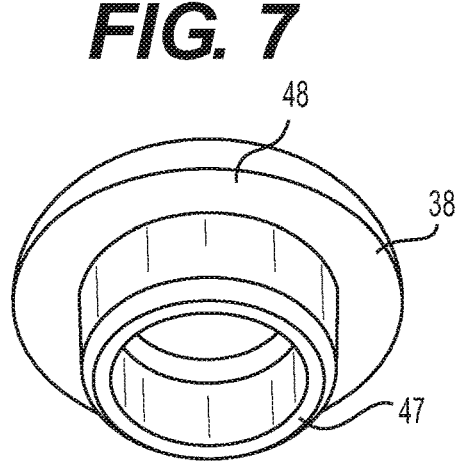
FIG. 8 is a bottom perspective view of the spring retainer used to retain the spring of the mixing element.

Referring now to FIGS. 1-8, the fluid mixing vessel, generally designated by the numeral 10, is shown. The vessel 10 has a substantially cylindrical main body 12 which is preferably tapered so that the lower end has a smaller diameter than the upper end, and is designed to be lightweight and portable and may include an optional wristband for attachment to the user's arm. The vessel 10 is preferably formed of a lightweight, fluid impermeable material such as polyethylene, and should be at least partially translucent to allow the user to see the contents in order to ascertain fluid levels and monitor the mixing process. In a preferred embodiment, the main body 12 has a fully transparent portion or window 14 large enough to allow the user to ascertain the level and condition (i.e., how well the fluid has been mixed) of the contents of the vessel 10.

The vessel 10 has three main components in addition to main body 12, a removable storage component 20, a mixing component 22, and a lid 26.

As is known in the art of sports drink vessels in particular, it is sometimes advantageous to mix a powder with a liquid immediately prior to consumption to maximize the nutrient availability. To that end, the removable storage component 20 is attached in fluid tight relation to the bottom portion 36 of main body 12 as by threading 21, and may include one or more gaskets or other means to form a tight seal as would be apparent to one of skill in the art. The storage component 20 may be used to contain a powdered substance such as a protein powder, or alternatively a liquid.

As is known in the art, merely shaking a vessel may not allow a powdered substance to effectively mix with liquid which will effect the efficacy of the resulting mixture. Because of the size and configuration of a typical sports drink vessel for example, which is designed to emphasize portability and therefore used outside of the home where a stirring means such as a spoon may not be readily available, shaking (as opposed to stirring or blending) is the only way to effect a desired mixture. The present invention is therefore configured to produce a mixture having a consistency like a stirred mixture as opposed to a shaken mixture consistency. Several features of the inventive design combine to produce this result.

A resilient connecting member such as a spring 34 is affixed to the removable bottom portion 36 of the vessel 10 by a retaining element 38. The spring 34 may have a spring constant in the range of 0.30 to 0.80 pounds per inch, but can be of course adjusted to accommodate, e.g., heavily viscous fluids. Threads 37 formed on the lower end of bottom portion 36 allow the bottom portion to be removed from the main body 12 of the vessel 10. The bottom portion 36 (see especially FIG. 4) thus functions as a vessel 10 closure while also serving to anchor the mixing component 22 within the vessel. Again, appropriate sealing means such as a gasket should be used to prevent leakage of the fluid contents of the vessel 10. An annular gripping portion 62 may include indentations or the like to facilitate removal of the bottom component 36. The top end of the spring 34 is attached to a turbine 40 via a suitably sized aperture 42 formed in the hub 43 of the turbine 40, the aperture 42 serving to capture the uppermost loop 44 of the spring 34. Thus, a two element fluid mixing component 22 is formed, the spring 34 and turbine 40 coacting to produce both vertical and angular reciprocation within a fluid medium when the vessel 10 is shaken vertically as will be explained in more detail later. The lower end of spring 34 is held in place by a retaining element 38 (see especially FIGS. 7 and 8) having an annular lip 48 sized to retain the lowermost loop of the spring 34, the retaining element 38 itself having a cylindrical bottom portion 47 sized for frictional fit within annular recess 49 formed on the bottom interior surface 69 of the bottom portion 36. It should be noted that the bottom interior surface 69 of the bottom portion 36 has a concave profile which creates a smoother more forceful fluid flow while also preventing an annular "dead spot" where sediment can collect. The dead spot is known to occur when the bottom interior of the vessel forms a right angle with the sidewalls of the vessel, as would be the case with a perfectly cylindrical vessel. The dead spot area is known to be difficult to clean as well.

The turbine 40 has a series of angularly spaced blades 45 extending from the hub 43, the blades angled to produce a stirring effect as is known in the art. The top portion 46 of blades 45 has a curved top profile, and is slightly more angled than the lower portion of the blades, the shape and angle of the blade 45 allowing for vigorous stirring action.

The lid 26 functions as both closure and dispenser as is known in the art. A lifting or dispensing tab 52 allows for dispensing the liquid via pour spout 54, the tab pivotally attached along the edge of grasping member 56, allowing for opening of the lid 26. The grasping member 56 extends radially from the edge of the lid 26 and terminates in opposing grasping handles 60, each of which have apertures formed therein. The spacing of the handles 60 allows the user to apply more torque when both attaching and removing the lid 26, which can be advantageous for individuals with limited strength such as the elderly and small children. Also, a key chain or other small lightweight item may be looped through the handles 60 for convenience.

In operation, the user may fill the vessel 10 with a liquid of choice, i.e., water, and may also fill the storage component 20 with a powdered substance or liquid. When mixing is desired, the user can unscrew the storage component 20 and pour the contents thereof into vessel 10 by removing lid 26. After sealing the lid 26, a vigorous up and down shaking motion will create vertical movement of the turbine 40, the movement limited and controlled by the spring 34. The movement of the fluid through blades 45 will impart a reciprocating rotational motion to the turbine 40, the direction of rotation corresponding to the direction of fluid flow as would be obvious to one of skill in the art. The spring 34 allows for smooth transitions of rotational direction of the turbine 40 to create a smooth stirring effect within the vessel 10. Mixing is further enhanced by the alternating compression and elongation of the spring 34 when the vessel 10 is shaken. As the spring 34 is retained at the bottom of the vessel 10 it will create turbulence only in this portion of the vessel 10 (where sediment will tend to accumulate), making it especially useful for breaking up clumps of, e.g., protein powder, the spring 34 not only creating turbulence but contacting and displacing the protein powder.

From the foregoing description, one skilled in the art can easily ascertain the essential characteristics of this invention and, without departing from the spirit and scope thereof, can make various changes and modifications of the invention to adapt it to various usages and conditions.

I claim:

1. A fluid mixing vessel comprising: a vessel main body; a mixing component positioned within said vessel, said mixing component having a spring loaded connecting member attached within said vessel, said spring loaded connecting member connected to allow both vertical displacement and rotational movement of said mixing component, said spring loaded connecting member forcing spring dampened reciprocal rotation of said mixing component in response to vertical displacement of fluid contained within said vessel wherein said mixing component comprises a turbine having a series of angularly spaced blades extending from a hub wherein a top portion of the blades have a curved top profile and said top portion is slightly more angled than a lower portion of the blades.

2. The vessel of claim 1 wherein said mixing component is positioned within a first compartment in said vessel, said vessel also including a second compartment, said second compart being a removable storage component.

3. The vessel of claim 1 including a removable lid which forms a first closure.

4. The vessel of claim 3 wherein said lid includes a grasping handle extending radially outward from said lid, the grasping handle having apertures formed therein.

5. The vessel of claim 2 wherein said mixing component is attached to a bottom portion of said first compartment of said vessel, said bottom portion being removably attached to said vessel to form a second closure.

6. The vessel of claim 5 wherein said bottom portion is attachable in sealed engagement with said vessel so as to form a removable lower closure.

7. The vessel of claim 5 wherein said bottom portion has a bottom interior surface having a concave profile.

8. The vessel of claim 2 wherein said storage component is attached to said bottom component.

9. The vessel of claim 1 wherein said spring loaded connecting member forces dampened vertical reciprocating motion of said mixing component in response to vertical shaking.

10. A fluid mixing vessel comprising: a vessel; a two part mixing component including a spring loaded connecting member attached to a turbine, said mixing component positioned within and attached to said vessel, said spring loaded connecting member connected within a bottom portion of said vessel to allow both vertical displacement and rotational movement of said turbine, said spring loaded connecting member positioned to create turbulence in said bottom portion of said vessel and forcing both spring dampened reciprocal rotation and oscillating vertical movement of said turbine in response to vertical displacement of fluid contained within said vessel wherein said turbine comprises a series of angularly spaced blades extending from a hub wherein a top portion of the blades have a curved top profile and said top portion is slightly more angled than a lower portion of the blades.

* * * * *